US012307736B2

(12) United States Patent
Shinoda

(10) Patent No.: US 12,307,736 B2
(45) Date of Patent: May 20, 2025

(54) IMAGE PROCESSING APPARATUS AND IMAGE PROCESSING METHOD

(71) Applicant: Lasertec Corporation, Kanagawa (JP)

(72) Inventor: Masafumi Shinoda, Yokohama (JP)

(73) Assignee: LASERTEC CORPORATION, Yokohama (JP)

( * ) Notice: Subject to any disclaimer, the term of this patent is extended or adjusted under 35 U.S.C. 154(b) by 490 days.

(21) Appl. No.: 17/929,252

(22) Filed: Sep. 1, 2022

(65) Prior Publication Data
US 2023/0073435 A1 Mar. 9, 2023

(30) Foreign Application Priority Data

Sep. 3, 2021 (JP) .................. 2021-143946

(51) Int. Cl.
G06V 10/60 (2022.01)
G06T 5/50 (2006.01)
G06T 7/11 (2017.01)
G06V 10/141 (2022.01)

(52) U.S. Cl.
CPC ............. *G06V 10/60* (2022.01); *G06T 5/50* (2013.01); *G06T 7/11* (2017.01); *G06V 10/141* (2022.01); *G06T 2207/10144* (2013.01); *G06T 2207/10152* (2013.01); *G06T 2207/20221* (2013.01)

(58) Field of Classification Search
None
See application file for complete search history.

(56) References Cited

U.S. PATENT DOCUMENTS 10,430,956 B2 * 10/2019 Lee ........................... G06T 5/50
10,838,190 B2 * 11/2020 Faris ......................... G06T 7/50
11,080,830 B2 * 8/2021 Kask ......................... G06T 7/11
(Continued)

FOREIGN PATENT DOCUMENTS

EP 2571256 A1 3/2013
JP 2013078108 A 4/2013
(Continued)

OTHER PUBLICATIONS

Japanese Patent Office, Office Action Issued in Application No. 2021-143946, Aug. 23, 2022, 6 pages. (Submitted with Machine Translation).

*Primary Examiner* — Anand P Bhatnagar
(74) *Attorney, Agent, or Firm* — McCoy Russell LLP

(57) ABSTRACT

An image processing apparatus according to the present disclosure includes: a photographing control unit configured to take a photographed image of a sample including a plurality of regions having different reflectances a plurality of times while a photographing condition that affects luminance of the photographed image is changed; a generation unit configured to generate a photographing condition map indicating a photographing condition under which luminance of a pixel in the photographed image exceeds a threshold; a determination unit configured to determine a photographing condition that is suitable for photographing of each of the regions based on the photographing condition map; and a composition unit configured to generate a composite image in which region images of the respective regions are combined by using the photographed image corresponding to the determined photographing condition.

7 Claims, 5 Drawing Sheets

(56) References Cited

U.S. PATENT DOCUMENTS

| | | | |
|---|---|---|---|
| 11,310,484 B1* | 4/2022 | Aman | H04N 13/366 |
| 12,177,413 B2* | 12/2024 | Aman | H04N 21/44029 |
| 2015/0116513 A1* | 4/2015 | Chen | H04N 23/683 |
| | | | 348/208.1 |
| 2017/0366729 A1* | 12/2017 | Itoh | H04N 23/82 |
| 2020/0134791 A1* | 4/2020 | Berlin | G06V 10/25 |
| 2022/0012874 A1* | 1/2022 | Maier-Hein | G06T 7/254 |
| 2022/0392032 A1* | 12/2022 | Mallick | G06V 10/82 |
| 2024/0155099 A1* | 5/2024 | Aman | H04N 21/458 |

FOREIGN PATENT DOCUMENTS

| | | |
|---|---|---|
| JP | 2013541038 A | 11/2013 |
| JP | 2013546083 A | 12/2013 |
| JP | 2017156212 A | 9/2017 |
| WO | 2012030825 A2 | 3/2012 |
| WO | 2012072613 A1 | 6/2012 |

* cited by examiner

IMAGE PROCESSING APPARATUS AND IMAGE PROCESSING METHOD

CROSS-REFERENCE TO RELATED APPLICATION

The present application claims priority to Japanese Patent Application No. 2021-143946, filed on Sep. 3, 2021. The entire contents of the above-listed application are hereby incorporated by reference for all purposes.

BACKGROUND

The present disclosure relates to an image processing apparatus and an image processing method, and, in particular, to an image processing technique for an image of a sample including a plurality of regions having different reflectances.

Japanese Unexamined Patent Application Publication No. 2013-78108 discloses an exposure controlling apparatus that controls an exposure amount of an imaging sensor to a proper value. Further, Japanese Unexamined Patent Application Publication No. 2013-546083 discloses a technique for adjusting a pixel intensity of a photographed image in accordance with an exposure time of another photographed image.

In some cases, a sample (e.g., a Multi-Tone mask) including a plurality of regions having different reflectances is observed. When such a sample is observed, it is necessary to adjust the luminance (brightness) for each region.

SUMMARY

As described above, when a sample including a plurality of regions having different reflectances is observed, it is necessary to adjust the luminance for each region. However, it is inconvenient for a user to have to make this adjustment. Note that this problem cannot be solved by the techniques disclosed in Japanese Unexamined Patent Application Publication Nos. 2013-78108 and 2013-546083.

The present disclosure has been made in order to solve such a problem, and provides an image processing apparatus and an image processing method by which the labor of adjusting luminance when a sample including a plurality of regions having different reflectances is observed is reduced.

An image processing apparatus according to the present disclosure includes:

a photographing control unit configured to take a photographed image of a sample including a plurality of regions having different reflectances a plurality of times while a photographing condition that affects luminance of the photographed image is changed;

a generation unit configured to generate a photographing condition map indicating a photographing condition under which luminance of a pixel in the photographed image reaches a specified value;

a determination unit configured to determine a photographing condition that is suitable for photographing of each of the regions based on the photographing condition map; and a composition unit configured to generate a composite image in which region images of the respective regions are combined by using the photographed image corresponding to the determined photographing condition.

Further, an image processing method according to the present disclosure includes:

taking a photographed image of a sample including a plurality of regions having different reflectances a plurality of times while a photographing condition that affects luminance of the photographed image is changed;

generating a photographing condition map indicating a photographing condition under which luminance of a pixel in the photographed image reaches a specified value;

determining a photographing condition that is suitable for photographing of each of the regions based on the photographing condition map; and generating a composite image in which region images of the respective regions are combined by using the photographed image corresponding to the determined photographing condition.

According to the present disclosure, it is possible to provide an image processing apparatus and an image processing method by which the labor of adjusting luminance when a sample including a plurality of regions having different reflectances is observed is reduced.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION

A specific configuration of the present embodiment will be described below with reference to the drawings. The following description shows one embodiment of the present disclosure, and the scope of the present disclosure is not limited to the following embodiments. In the following description, the same reference symbols indicate substantially the same contents.

First Embodiment

Figure 1:
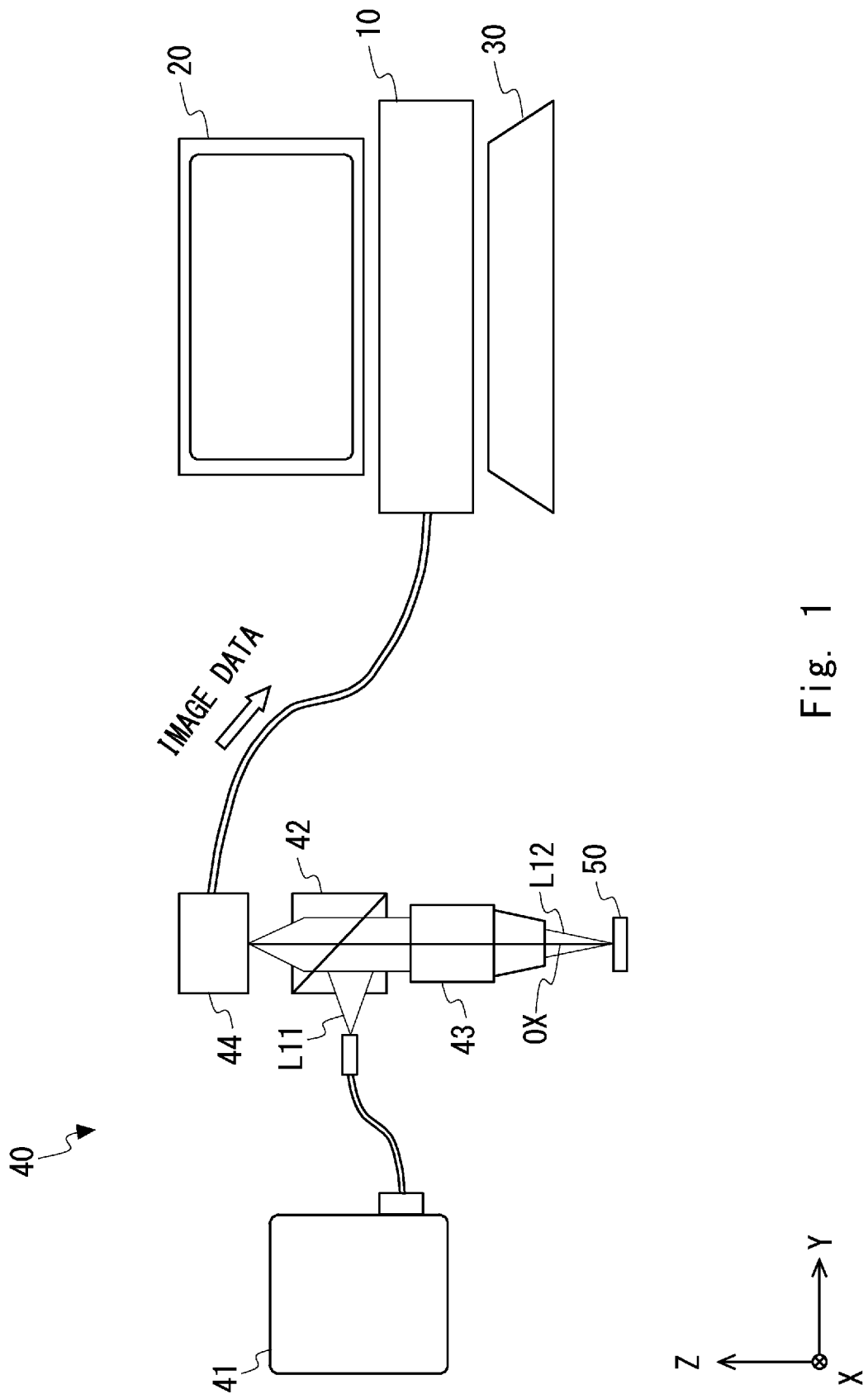
FIG. 1 is a schematic configuration diagram of a system including an image processing apparatus according to a first embodiment.

An image processing apparatus 10 according to a first embodiment will be described with reference to FIG. 1. FIG. 1 is a schematic configuration diagram schematically showing a system including the image processing apparatus 10 according to the first embodiment. The system shown in FIG. 1 includes the image processing apparatus 10, a display apparatus 20, an input apparatus 30, and an imaging optical system 40.

FIG. 1 shows a three-dimensional orthogonal coordinate system of XYZ for clarification of the description. Note that the Z direction is a vertical direction and parallel to a thickness direction of a sample 50. Thus, the Z direction is a height direction. An upper surface of the sample 50 includes a plurality of regions having different reflectances. The sample 50 may be, for example, a Multi-Tone mask. Note that the sample 50 is not limited to a photomask, and may instead be any other sample (e.g., a wafer). The sample 50 may be mounted on a drive stage that moves the sample 50 in the XY direction.

The image processing apparatus 10 is a computer including a processor and a memory. The image processing apparatus 10 has a function of controlling the imaging optical system 40 which will be described later. The image processing apparatus 10 takes a photographed image of the sample 50 a plurality of times while a photographing condition (e.g., intensity of illumination or an exposure time) is changed. Then the image processing apparatus 10 generates a composite image in which the images of the respective regions are combined. The details of the functions of the image processing apparatus 10 will be described later. The display apparatus 20 is a display apparatus, such as a display, which displays a composite image generated by the image processing apparatus 10. The input apparatus 30 is an input apparatus, such as a mouse and a keyboard, which receives an operation input by a user.

The imaging optical system 40 includes a light source 41, a beam splitter 42, an objective lens 43, and a camera 44. The imaging optical system 40 may be provided with an optical element other than the components described above such as a lens, an optical scanner, a mirror, a filter, a beam splitter, and the like. For example, the imaging optical system 40 may be a confocal optical system.

The light source 41 generates an illumination light L11. The light source 41 may be a lamp light source, a Light Emitting Diode (LED) light source, a laser light source, or the like. The illumination light L11 from the light source 41 enters the beam splitter 42. The beam splitter 42, which is, for example, a half mirror, reflects substantially half of the illumination light L11 in the direction of the sample 50. The illumination light L11 reflected by the beam splitter 42 enters the objective lens 43. The objective lens 43 concentrates the illumination light L11 onto the sample 50. By doing so, the surface of the sample 50 can be illuminated. An optical axis OX of the objective lens 43 is parallel to the Z direction. The illumination light L11 may be, for example, a line-shaped illumination region in which the X direction is defined as being the longitudinal direction.

A reflected light L12 reflected on the surface of the sample 50 is concentrated by the objective lens 43 and made to enter the beam splitter 42. The beam splitter 42 transmits substantially half of the reflected light L12. The reflected light L12 transmitted through the beam splitter 42 enters the camera 44. By the above, the camera 44 can capture an image of the sample 50. The image of the sample 50 is magnified and projected on the camera 44 by the objective lens 43. Further, a lens or the like for forming an image of the reflected light L12 on a light-receiving surface of the camera 44 may be provided.

The camera 44 includes an imaging element for capturing an image of the sample 50. The camera 44 is a Charge Coupled Device (CCD) camera, a Complementary Metal Oxide Semiconductor (CMOS) sensor, or the like. The camera 44 detects the reflected light L12 from the detection region illuminated by the illumination light L11. The camera 44 outputs image data of the photographed image to the image processing apparatus 10.

Figure 2:
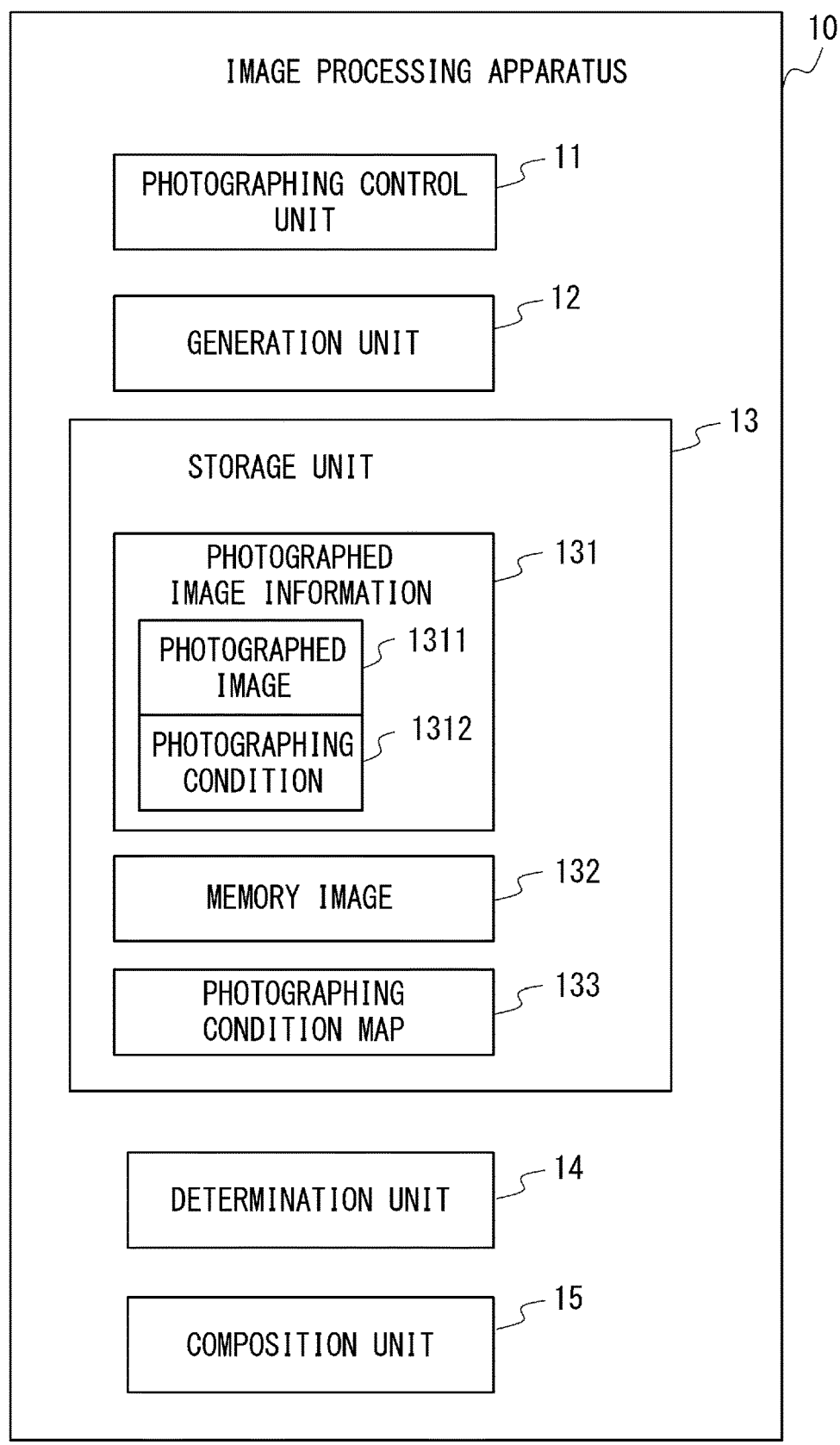
FIG. 2 is a block diagram showing a configuration of the image processing apparatus according to the first embodiment.

Next, the functions of the image processing apparatus 10 will be described in detail with reference to FIG. 2. The image processing apparatus 10 includes a photographing control unit 11, a generation unit 12, a storage unit 13, a determination unit 14, and a composition unit 15.

The photographing control unit 11 takes a photographed image of the sample 50 a plurality of times while a photographing condition that affects luminance (brightness) of the photographed image is changed. The photographing conditions are, for example, an exposure time or an intensity of illumination. When the photographing condition is an exposure time, the photographing control unit 11 takes a photographed image a plurality of times while the exposure time of the camera 44 is changed. When the photographing condition is an intensity of illumination, the photographing control unit 11 takes a photographed image a plurality of times while the intensity of illumination of the light source 41 is changed. The photographing control unit 11 may change the exposure time or the intensity of illumination from the minimum value to the maximum value at regular time intervals. The photographing control unit 11 associates the photographed image with the photographing condition and registers them in the storage unit 13.

The generation unit 12 generates a map (referred to as a photographing condition map) indicating a photographing condition under which the luminance of each pixel in the photographed image reaches a specified value (specified brightness). The generation unit 12 may generate a memory image 132, which will be described later, and generate a photographing condition map 133 using the memory image 132.

The storage unit 13 includes a storage medium such as a memory. The storage unit 13 stores photographed image information 131, the memory image 132, and the photographing condition map 133. In the photographed image information 131, a photographed image 1311 is associated with a photographing condition 1312. The photographed image 1311 is an image (a raw image) that has been not subject to image processing.

The memory image 132 is an image generated based on the photographed image 1311. First, the photographed image first taken is registered in the memory image 132. When the luminance of each pixel in the photographed image 1311 newly taken is equal to or less than a specified value and is larger than the luminance of the corresponding pixel in the memory image 132, the generation unit 12 updates the luminance of the corresponding pixel in the memory image 132. In other words, although the generation unit 12 updates the luminance (pixel value) of the corresponding pixel in the memory image 132 when the luminance of each pixel becomes larger than that of the registered memory image 132, the generation unit 12 stops the updating of the luminance when the luminance reaches the specified value.

Figure 3:
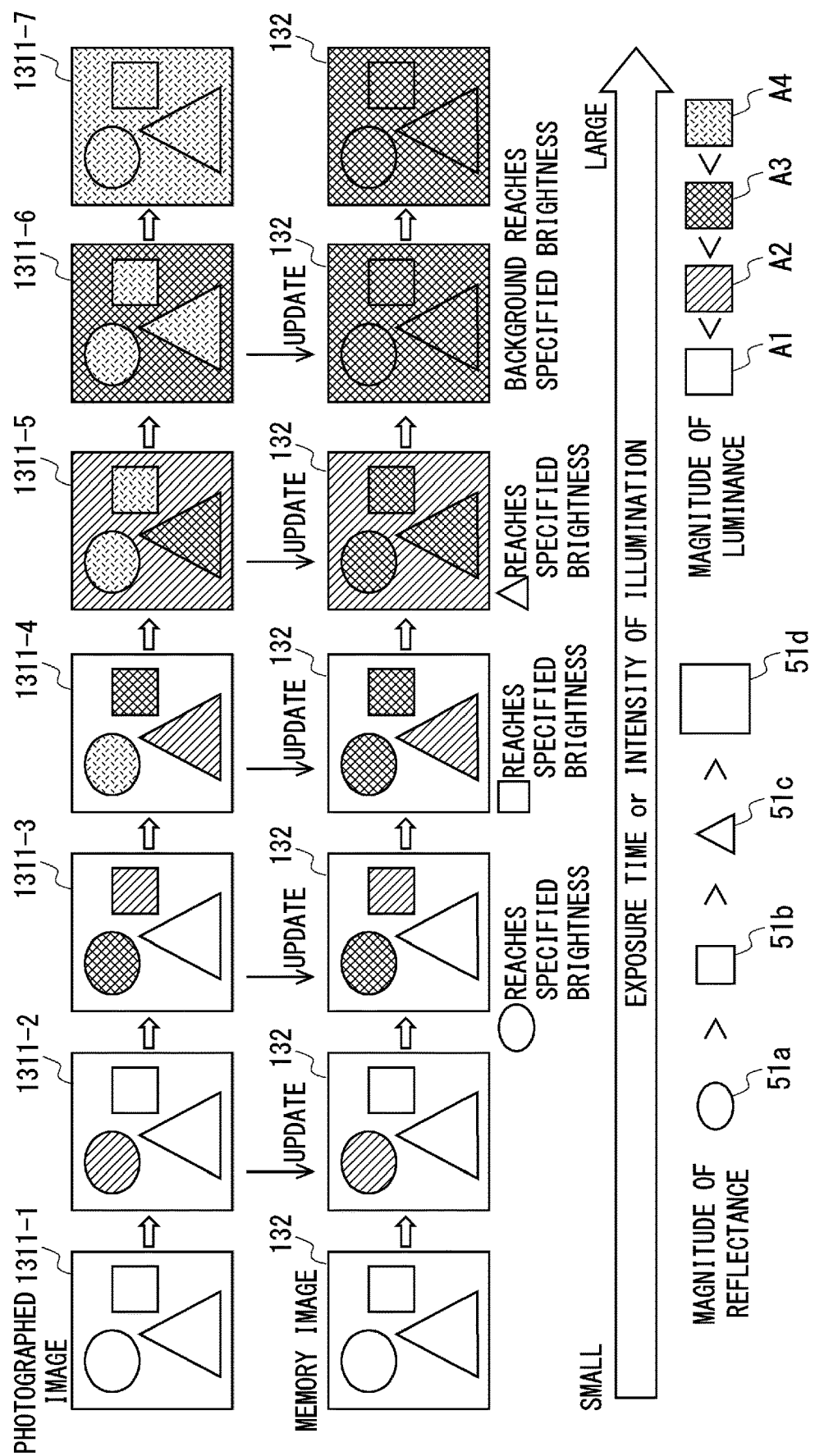
FIG. 3 is a schematic diagram showing a method for updating a memory image in the image processing apparatus according to the first embodiment.

FIG. 3 shows changes in the photographed image 1311 and the memory image 132 when a photographing condition (e.g., an exposure time or an intensity of illumination) is changed so that the luminance becomes large. The sample 50 includes four regions 51a, 51b, 51c, and 51d having different reflectances. The region 51a is a circular region, the region 51b is a square region, the region 51c is a triangular region, and the region 51d is a background region. The largest magnitude of the reflectance is that of the region 51a, the second largest magnitude of the reflectance is that of the region 51b, the third largest magnitude of the reflectance is that of the region 51c, and the smallest magnitude of the reflectance is that of the region 51d. Further, in FIG. 3, the magnitude of the luminance is indicated by hatching. The largest luminance is indicated by a hatching A1, the second largest luminance is indicated by a hatching A2, the third largest luminance is indicated by a hatching A3, and the smallest luminance is indicated by a hatching A4. The hatching A3 corresponds to a specified value of the luminance. The hatching A4 corresponds to a value when the luminance is saturated.

A plurality of photographed images 1311-1, 1311-2, 1311-3, 1311-4, 1311-5, 1311-6, and 1311-7 are taken while the exposure time for each photographed image is changed from a short time to a long time or the intensity of illumination for each photographed image is changed from a small value to a large value. The memory image 132 is updated in accordance with the photographing of the photographed images 1311-1 to 1311-7.

First, the photographed image 1311-1 is taken and registered as the memory image 132. Next, the photographed image 1311-2 is taken. In the photographed image 1311-2, the luminance of the region 51a having a high reflectance is large. In the memory image 132, the luminance of each pixel in the regions 51a, 51b, 51c, and 51d is updated in accordance with the luminance of the corresponding pixel in the photographed image 1311-2.

In the photographed image 1311-3, the luminance of the region 51b becomes large, and the luminance of the region 51a has reached a specified value. In the memory image 132, the luminance of each pixel in the regions 51a, 51b, 51c, and 51d is updated in accordance with the luminance of the corresponding pixel in the photographed image 1311-3.

In the photographed image 1311-4, the luminance of the region 51c becomes large, the luminance of the region 51b has reached a specified value, and the luminance of the region 51a is saturated. In the memory image 132, the luminance of each pixel in the regions 51b, 51c, and 51d is updated in accordance with the luminance of the corresponding pixel in the photographed image 1311-4.

In the photographed image 1311-5, the luminance of the region 51d becomes large, the luminance of the region 51c has reached a specified value, and the luminance of each of the regions 51a and 51b is saturated. In the memory image 132, the luminance of each pixel in the regions 51c and 51d is updated in accordance with the luminance of the corresponding pixel in the photographed image 1311-5.

In the photographed image 1311-6, the luminance of the region 51d has reached a specified value, and the luminance of each of the regions 51a, 51b, and 51c is saturated. In the memory image 132, the luminance of each pixel in the region 51d is updated in accordance with the luminance of the corresponding pixel in the photographed image 1311-6. By the above, the memory image 132 in which the entire surface of the sample has a uniform luminance (specified value) is obtained.

In the photographed image 1311-7, the luminance of each of the regions 51a, 51b, 51c, and 51d is saturated. Note that the composition unit 15, which will be described later, may generate a composite image in which region images of the regions 51a, 51b, 51c, and 51d are combined and register it in the memory image 132. By doing the above, the memory image 132 in which the luminance of each region is a specified value can be converted into the memory image 132 in which the luminance of each region has a certain gradation.

In the above description, the case in which the updating of luminance is stopped when the luminance coincides with a specified value has been focused on. However, the generation unit 12 may instead determine to stop the updating of the memory image 132 on the condition that the luminance thereof has exceeded a specified value. In the following description, it is assumed that the hatching A3 in FIG. 3 corresponds to the luminance of less than a specified value, and the hatching A4 corresponds to the luminance exceeding the specified value. In this case, the luminance of each pixel in the region 51a of the photographed image 1311-3 is equal to or less than the specified value and is larger than the luminance of each pixel in the region 51a of the memory image 132 before updating of it. Therefore, the luminance of each pixel in the region 51a of the memory image 132 is updated based on the photographed image 1311-3. Further, since the luminance of each pixel in the region 51a of the photographed image 1311-4 exceeds the specified value, the luminance of each pixel in the region 51a of the memory image 132 is not updated. Therefore, in the updating of the luminance in the region 51a of the memory image 132, the updating of the luminance based on the photographed image 1311-3 will be the last updating according to the determination regarding the photographed image 1311-4.

Referring back to FIG. 2, the description will be continued. The photographing condition map 133 stored in the storage unit 13 records a photographing condition under which the luminance of each pixel in the photographed image 1311 reaches a specified value. Next, a method for generating the photographing condition map 133 will be described with reference to FIG. 4.

Figure 4:
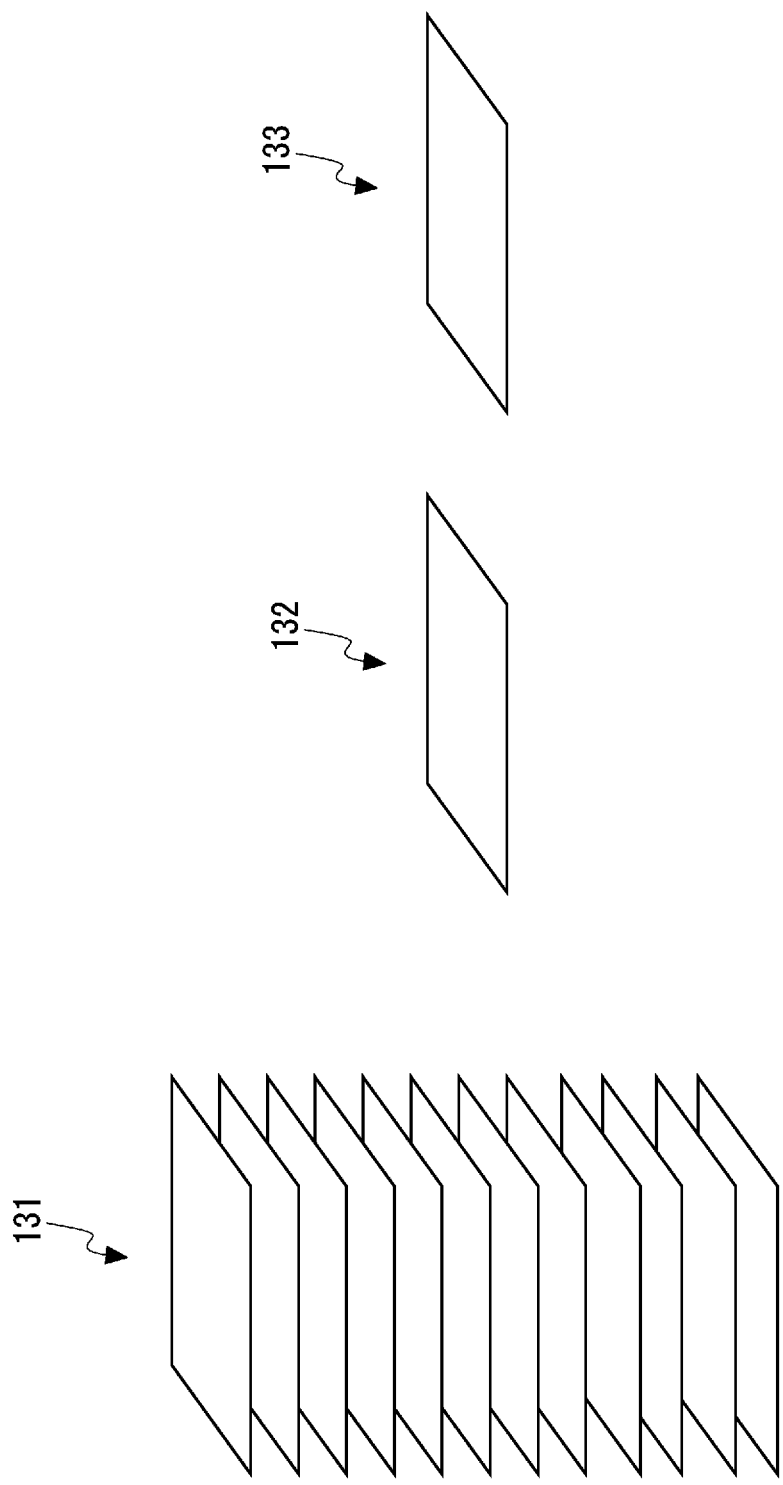
FIG. 4 is a schematic diagram showing photographed image information, a memory image, and a photographing condition map stored by the image processing apparatus according to the first embodiment.

FIG. 4 is a schematic diagram schematically showing information stored in the storage unit 13. It is assumed that the photographing control unit 11 has taken a photographed image a plurality of times while an exposure time is changed. First, the photographed image 1311 for each exposure time is registered as the photographed image information 131. Further, as described above, when the luminance of each pixel in the photographed image 1311 gradually increases, the latest luminance of each pixel is registered in the memory image 132. However, when the luminance of each pixel exceeds a specified value, the luminance of the pixel is not updated.

An exposure time corresponding to the luminance of each pixel in the memory image 132 is registered in the photographing condition map 133. The generation unit 12 generates the photographing condition map 133 by using the memory image 132. When the generation unit 12 registers or updates the luminance of each pixel in the memory image 132, it registers or updates the photographing condition of the pixel in the storage unit 13. By doing so, the generation unit 12 can generate the photographing condition map 133.

In other words, each time the generation unit 12 updates the memory image 132, the generation unit 12 records a set value of the intensity of illumination or the exposure time at that time for each pixel. By doing so, when the memory image 132 is completed, the photographing condition map 133 is also generated. The photographing condition map 133 provides an average exposure time or intensity of illumination for each region (e.g., a region having a high reflectance, a region having a medium reflectance, and a region having a low reflectance). The distribution of the exposure times and the like in each region and the average exposure time and the like can be obtained from the photographing condition map 133.

Masks, wafers, and the like of the number of surfaces having different reflectances can be scanned based on the photographing condition map 133. As a result, the composition unit 15, which will be described later, can generate a composite image in which the entire surface of the sample has a uniform brightness.

Referring back to FIG. 2, the description will be continued. The storage unit 13 may further store a computer program (not shown) for implementing the image processing method according to the first embodiment.

The determination unit 14 determines a photographing condition suitable for photographing of each region based on the photographing condition map 133. In the case of FIG. 3, the determination unit 14 determines a photographing condition a (e.g., a photographing condition when the photographed image 1311-3 has been taken) suitable for photographing of the region 51a, a photographing condition b (e.g., a photographing condition when the photographed image 1311-4 has been taken) suitable for photographing of the region 51b, a photographing condition c (e.g., a photographing condition when the photographed image 1311-5 has been taken) suitable for photographing of the region 51c, and a photographing condition d (e.g., a photographing condition when the photographed image 1311-6 has been taken) suitable for photographing of the region 51d.

Figure 5:
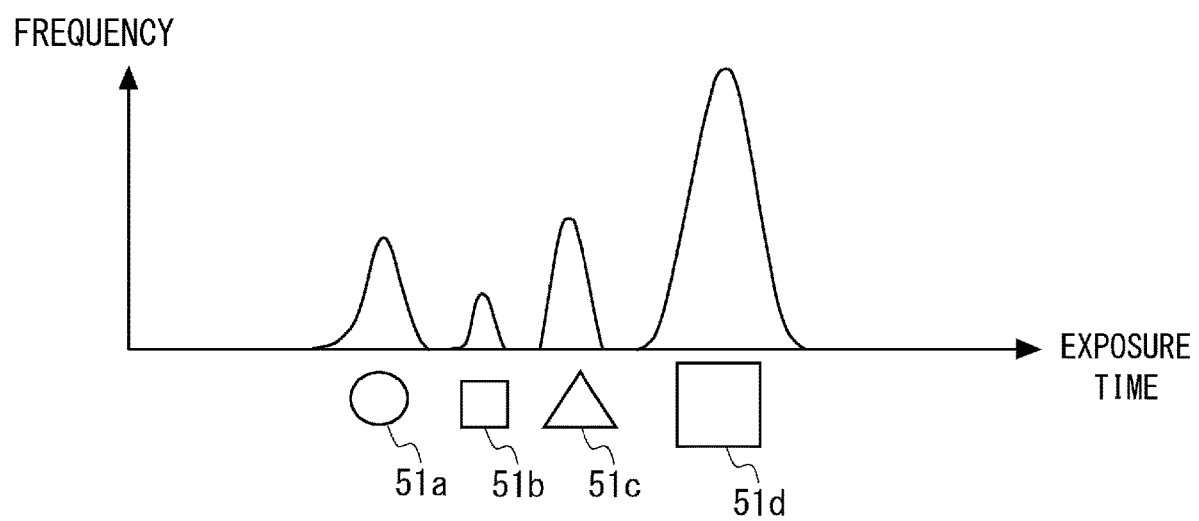
FIG. 5 is a histogram showing a distribution of photographing conditions in the photographing condition map.

Specifically, the determination unit 14 may determine the photographing condition of each region based on the distribution of the photographing conditions in the photographing condition map 133. FIG. 5 is a graph showing the distribution of exposure times in the photographing condition map 133. The horizontal axis indicates an exposure time, and the vertical axis indicates a frequency. The graph includes peaks corresponding to the respective regions 51a, 51b, 51c, and 51d. A photographing condition suitable for photographing of each region can be determined from this graph. For example, the photographing condition a may be determined based on a photographing condition at a peak corresponding to the region 51a, an average exposure time in the region 51a, and the like.

Referring back to FIG. 2, the description will be continued. The composition unit 15 generates a composite image in which region images of the respective regions are combined by using the photographed image corresponding to the determined photographing condition. In the case of FIG. 3, the composition unit 15 selects the photographed image 1311-3 taken under the photographing condition a, the photographed image 1311-4 taken under the photographing condition b, the photographed image 1311-5 taken under the photographing condition c, and the photographed image 1311-6 taken under the photographing condition d from the photographed image information 131. Then, the composition unit 15 extracts the region image of the region 51a from the photographed image 1311-3, extracts the region image of the region 51b from the photographed image 1311-4, extracts the region image of the region 51c from the photographed image 1311-5, and extracts the region image of the region 51d from the photographed image 1311-6. Finally, the composition unit 15 generates a composite image in which the extracted region image of the region 51a, the extracted region image of the region 51b, the extracted region image of the region 51c, and the extracted region image of the region 51d are combined.

A defect inspection may be performed based on the generated composite image. By acquiring, when a defect is detected in a part including regions having different reflectances, an Exposure Scan Memory (ESM) image obtained by sweeping an exposure time and the like, it is possible to acquire a satisfactory defect image.

Finally, an effect obtained by the image processing apparatus according to the first embodiment will be described. When the entire surface of a sample cannot be observed with a uniform brightness at a constant intensity of illumination and with a constant exposure time, it is necessary to set the intensity of illumination or the exposure time for each region and then to observe the region. Alternatively, it is conceivable that an observation can be made using a camera having a sensitivity of High Dynamic Range (HDR). However, in some cases, an observation using a camera having a sensitivity of HDR cannot be performed. With the image processing apparatus according to the first embodiment, regarding an observation surface of a sample having a combination of different reflectances, it is possible to generate an image of the observation surface having a uniform brightness and thus reduce the labor of adjusting the brightness of the image for each region.

Although the embodiment of the present disclosure has been described above, the present disclosure includes appropriate modifications that do not impair objects and advantages thereof. Further, the present disclosure is not limited to the above-described embodiment.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

The invention claimed is:

1. An image processing apparatus comprising:
   a photographing control unit configured to take a photographed image of a sample including a plurality of regions having different reflectances a plurality of times while a photographing condition that affects luminance of the photographed image is changed;
   a generation unit configured to generate a photographing condition map indicating a photographing condition under which luminance of a pixel in the photographed image reaches a specified value;
   a determination unit configured to determine a photographing condition that is suitable for photographing of each of the regions based on the photographing condition map; and
   a composition unit configured to generate a composite image in which region images of the respective regions are combined by using the photographed image corresponding to the determined photographing condition.

2. The image processing apparatus according to claim 1, wherein the determination unit determines the photographing condition of each of the regions based on a distribution of the photographing conditions in the photographing condition map.

3. The image processing apparatus according to claim 1, wherein
   the generation unit registers in a storage unit, as a memory image, the photographed image first taken, and then when the luminance of the pixel in the photographed image newly taken is equal to or less than the specified value and is larger than the luminance of the corresponding pixel in the memory image, the generation unit updates the luminance of the corresponding pixel in the memory image, and
   the generation unit generates the photographing condition map by using the memory image.

4. The image processing apparatus according to claim 1, wherein the photographing condition is an exposure time.

5. The image processing apparatus according to claim 1, wherein the photographing condition is an intensity of illumination.

6. The image processing apparatus according to claim 1, wherein the sample is a Multi-Tone mask.

7. An image processing method comprising:
- taking a photographed image of a sample including a plurality of regions having different reflectances a plurality of times while a photographing condition that affects luminance of the photographed image is changed;
- generating a photographing condition map indicating a photographing condition under which luminance of a pixel in the photographed image reaches a specified value;
- determining a photographing condition that is suitable for photographing of each of the regions based on the photographing condition map; and
- generating a composite image in which region images of the respective regions are combined by using the photographed image corresponding to the determined photographing condition.

\* \* \* \* \*